May 1, 1934.  R. C. FORRER  1,956,760

METHOD AND APPARATUS FOR THE MAGNETIC SEPARATION OF MIXED PRODUCTS

Filed May 2, 1932  2 Sheets-Sheet 1

Inventor:
Robert Charles Forrer
By Mauro & Lewis
Attorneys

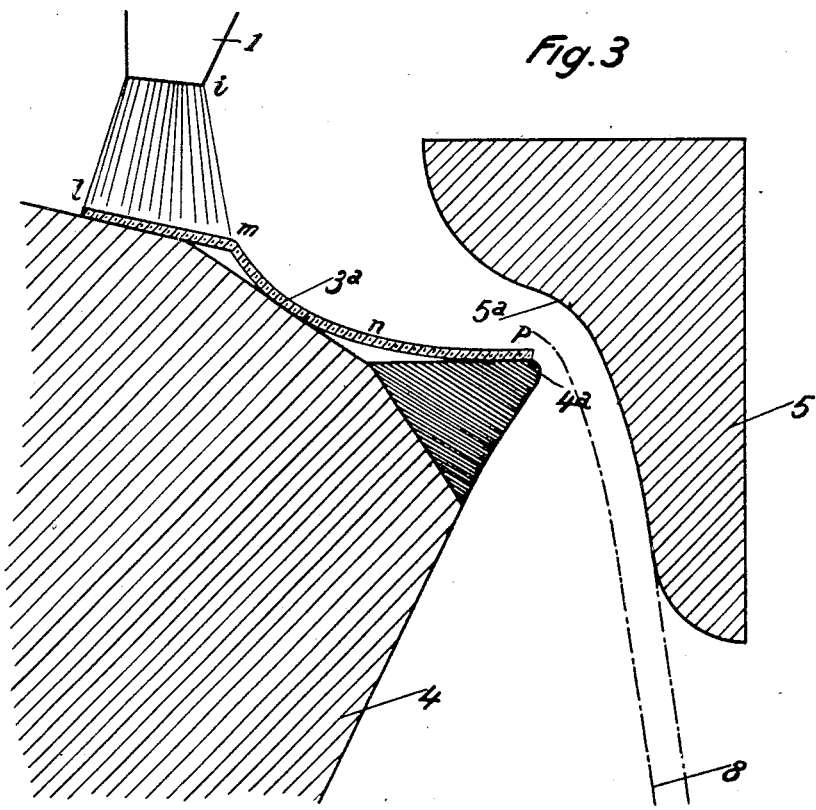
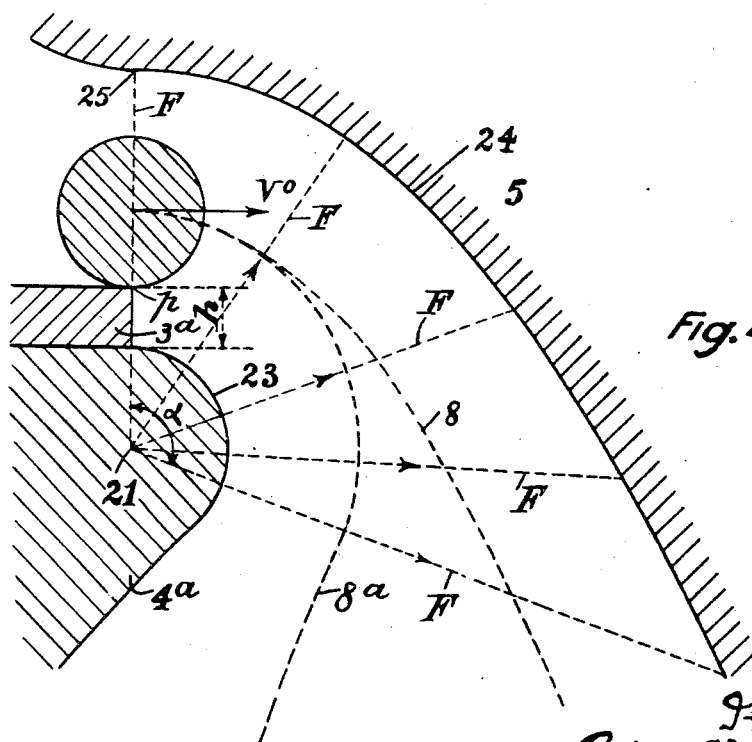

Patented May 1, 1934

1,956,760

UNITED STATES PATENT OFFICE

1,956,760

METHOD AND APPARATUS FOR THE MAGNETIC SEPARATION OF MIXED PRODUCTS

Robert Charles Forrer, Strasbourg, France, assignor of one-half to Mines Domaniales de Potasse d'Alsace, Mulhouse, France, a corporation of France Application May 2, 1932, Serial No. 608,785
In France May 8, 1931

11 Claims. (Cl. 209—223)

The present invention has for its object a method and an apparatus for the separation of little, or very little, magnetic products, according to which use is made of the action of the magnetic field produced by an electro-magnet.

The essential feature of the method according to my invention is that the products to be separated are introduced with a relatively small horizontal speed $V_0$ and without any vertical speed, into a very intense magnetic field, said field being preferably radial, with lines of force that are disposed almost as if they originated from the center of curvature of the free fall parabola at the origin thereof.

As, in the vicinity of its vertex, a parabola may be assimilated to a circular arc having its center at the center of curvature of the parabola at the vertex thereof, the magnetic field acts in a direction at right angles to the trajectory of the free falling particles and, as it has been proved by the results obtained, it is possible thus to obtain a very good separation of the paramagnetic and diamagnetic parts, which are deflected on either side of said free fall parabola.

The apparatus for carrying out that method comprises an electro-magnet between the pole pieces of which the products are conveyed by a slide or chute the end of which is horizontal or substantially horizontal, said slide or chute being preferably given an oscillatory horizontal movement at right angles to the direction of the motion of the products to be separated. The apparatus further comprises, below the electromagnet, a series of boxes or hoppers suitably placed on either side of the trajectory corresponding to a freely falling body, and also an organ placed at a suitable point of said trajectory, and which serves to deflect into special boxes the products that have been but little influenced by the magnetic field.

The pole pieces of the electro-magnet have a special shape so as to produce an intense and radial magnetic field, and that shape, which will be hereinafter described constitutes one of the features of my invention.

Said pole pieces form, on either side of the trajectory of the matters to be divided, cylinders the directrixes of which correspond to the form of the trajectory, that is have, in the vicinity of the origin of the said trajectory, the same center of curvature as the free fall parabola. Furthermore, one of said pole pieces, which is located below the slide or chute forms a ridge and has the shape of a cylinder the directrix of which is a portion of a circular arc or a similar curve having a small radius of curvature. In order to increase the non-uniformity of the filed as well as its intensity, it is advantageous to make the end of the last mentioned pole piece of ferro-cobalt or any other very permeable material.

Preferred embodiments of my invention will be hereinafter described with reference to the accompanying drawings, given merely by way of example, and in which:

Fig. 3 shows, at an enlarged scale, a particular shape of pole pieces which has proved to be very advantageous;

Fig. 4 shows, at a still larger scale, the active ends of the pole pieces.

Figure 1:
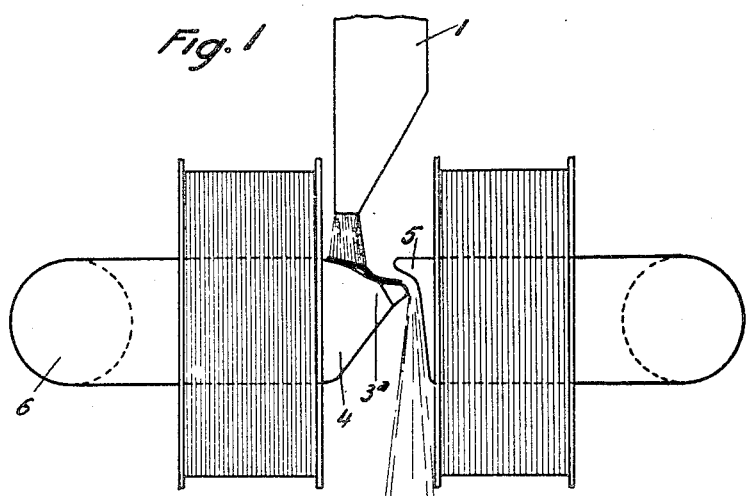
Fig. 1 is an elevational view of an embodiment of my invention.

The apparatus shown in the drawings comprises a hopper 1 containing the matter to be treated, which falls upon a slide or chute $lmnp$. Said slide consists of three distinct portions. The first one, $lm$, is adapted to receive the product to be treated, which falls thereon from hopper $l$, and it is so disposed that the bottom of the talus from said hopper extends as far as line $m$. The following portion, $mn$, is more inclined while portion $np$ ends horizontally or substantially so. Slide or chute $lmnp$ is given an oscillatory transversal movement which allows a portion of the talus from the hopper to move past ridge $m$ with a velocity smaller than $V_0$. Along part $mn$ of the slide that velocity increases and becomes greater than $V_0$, which destroys the superposition of the grains. Along portions $np$ of the slide, as the velocity decreases the grains are brought close to each other so as to form a regular sheet which leaves ridge $p$ with a horizontal velocity $V_0$. The disposition of the matter in the shape of a sheet makes it possible to obtain a perfect separation because the grains, forming a single layer in the horizontal direction, are, so to speak, separated from one another, each in its vertical plane and there are no shocks or kinetic reactions to interfere with the action of gravity and that of the magnetic field. The separation therefore takes place in a vertical plane for each grain; by increasing the length of the slot or space between the pole pieces, the output of the apparatus is proportionally increased.

However that arrangement is not absolutely necessary, in particular for fine products.

Figure 2:
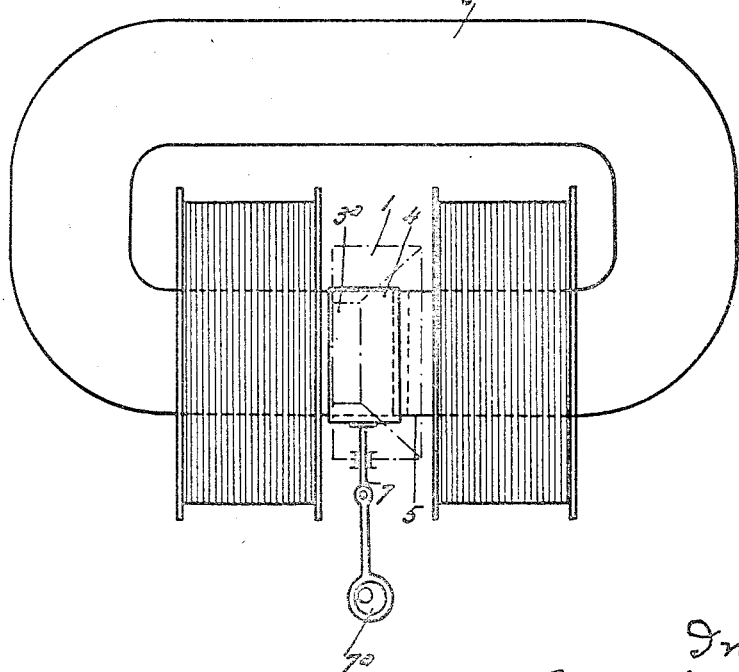
Fig. 2 is a plan view corresponding to Fig. 1.

The oscillatory transversal movement of slide $lmnp$ is obtained through an arrangement such as a connecting rod and an eccentric 7, 7a (Fig. 2), or through any equivalent means. Due to the initial velocity $V_0$ that is imparted to them when leaving slide $lmnp$, the products would move along free fall parabola 8, shown in dotted lines in Figs. 3 and 4, if the magnetic field did not exist. When that field exists, only the non-magnetic products follow that trajectory 8. On the contrary, the para-magnetic and dia-magnetic products which are subjected to the action of the field are deviated either toward the left or toward the right of that parabola and are collected in boxes or hoppers 9, 10, suitably located. The products that are but little influenced by the magnetic field fall upon an elastic band, for instance a piano string, against which they rebound, so as to finally fall into one or the other of boxes 12 and 13.

The pole pieces of the electro-magnet are preferably of the shape illustrated in Fig. 3, and, at an enlarged scale, in Fig. 4, or of a similar shape. In that latter figure, 21 is the center of curvature of the free fall parabola 8 at its vertex 8. One of the pole pieces, 4, has the shape of a cylinder $4a$ the directrix of which includes a circular arc 23 of small radius having its origin on the vertical of the end $p$ of slide $3a$, and its center at 21. The other pole piece 5 is bounded, opposite piece $4a$, by a cylinder the directrix 24 of which is a parabola equidistant from free fall parabola 8 and the vertex of which is at 25 on the vertical of the slide $p$ of the slide. The field created by said pole pieces is extremely intense. Furthermore it is radial and the lines of force may be considered, for all practical purposes, as passing all through the common center of curvature 21 of cylinder 23 and parabola 8, as shown by the dotted lines F.

As shown in the drawings, said lines of force are normal to parabola 8 at the beginning of the fall of the particles.

In the absence of a magnetic field, the particles dropped in the apparatus would move along the free fall parabola 8. When a magnetic field is present, only the non magnetic particles, which are not influenced by the field, move along that trajectory, but the magnetic particles that are attracted by pole piece $4a$ run out of the parabola toward said pole piece $4a$. As they get nearer and nearer to said pole piece $4a$, the magnetic action to which they are subjected increases, as it results from the radial character of the field. Said particles are therefore more and more deviated and they follow a path of travel such as $8a$. By varying the thickness $h$ of the slide or chute $lmnp$, I can vary the distance of said path $8a$ from piece $4a$, and accordingly the action of the apparatus.

$\alpha$ designates the angle within which the action of the magnetic field is particularly intense. In the drawings, said angle is about 100° but it might be increased or reduced by modifying the shape of the pieces. In order to increase the efficiency of the apparatus, it is advantageous to make the end $4a$ of piece 4 of ferro-cobalt, the remainder of piece 4 being made of iron. Furthermore, pole piece 5 is preferably made of very pure soft iron.

In an experiment I used an electro-magnet having cores of 7.5 cm. thickness. The thickness of the sheet of products brought onto slide or chute $lmnp$ was about 6 mm.; the horizontal velocity was 17 cms. per second, and the intensity of the field was about 20,000 gauss. The height of fall, that is the distance between magnetic part $4a$ and the boxes 9, 10 was about 20 cms.

The apparatus may be of the double type, the magnetic circuit then comprising four pole pieces and two slots between said pole pieces.

The apparatus above described has given very good results with a mixture of a dia-magnetic salt and of copper sulphate, the latter, although very little magnetic, being very satisfactorily separated. The matter collected in one of the boxes 9, 10 contained 98% of dia-magnetic salt, while the matter collected in the other box contained 99.4% of copper sulphate.

With potassium salts, the results have been as follows:

855 grammes of refuse salt (4mm/10mm) passing with a small velocity (1000 kilogrammes per hour for a slot of one meter) having the following composition:

16.2%—138 gr. KCl
25.5%—219 gr. insoluble substances
54.1%—462 gr. NaCl
4.2%— 36 gr. $MgCl_2$, $SO_4Ca$, give, after passing through the apparatus 210 gr. shales—166 gr. insol. mat. containing 35 gr. anhydrite
    8 gr. KCl
    36 gr. NaCl—$2MgCl_2$ and 7 soluble anhydrite.

610 gr. salt—49 gr. insol. mat. containing 39 gr. anhydrite
    114 gr. KCl
    447 gr. NaCl—½ $MgCl_2$ and 22 soluble anhydrite 35 gr. mixed—16 gr. insol. mat. containing 10 gr. anhydrite
    3 gr. KCl
    16 gr. NaCl—1 $MgCl_2$ and 2 soluble anhydrite In another case I treated:
1000 grammes of fine salt (0/4mm) passing slowly through the apparatus (1000 kilogrammes per hour) having the following composition:

28.9%—289 gr. KCl
61.3%—613 gr. NaCl
10.8%—108 gr. insoluble matters

I obtained:

140 gr. shales and insol. matters—
    63 gr. insol. mat. containing 6 gr. anhydrite
    24 gr. KCl
    53 gr. NaCl 860 gr. of salt— 43 gr. insol. mat. containing 14 gr. anhydrite
    266 gr. KCl
    551 gr. NaCl While I have disclosed what I deem to be a preferred embodiment of my invention it should be well understood that I do not wish to be limited thereto as there might be changes made in the arrangement, disposition and form of the parts without departing from the principle of my invention as comprehended within the scope of the appended claims.

What I claim is:

1. An apparatus for separating mixed bodies that are but little magnetic which comprises in combination, an electro-magnet, two cylindrical pole pieces for said electro-magnet having an air gap between them, the cross sections of the opposite faces of said respective pole pieces having a common center of curvature, and means for causing said bodies to be thrown into said air gap in the form of a sheet parallel to said cylindrical faces in a substantially horizontal direction with a relatively small velocity, said velocity being so chosen that the center of curvature of the parabola that each of said bodies would describe if it were not subjected to the magnetic field, at the vertex of said parabola, coincides with the center of curvature of said cross sections.

2. An apparatus for separating mixed bodies according to claim 1 in which the pole piece that is located below said means has the shape of a cylinder the directrix of which comprises a circular arc the center of which coincides with said center of curvature.

3. An apparatus for separating mixed bodies according to claim 1 further comprising an elastic narrow member disposed below said air gap in parallel relation with said cylindrical pole pieces, so as to extend exactly across the path that said bodies would follow if they were not subjected to a magnetic field, and boxes disposed below said elastic member for receiving the separated bodies.

4. An apparatus for separating mixed bodies according to claim 1 in which the pole piece that is located below said means has its extremity made of a very magnetic material.

5. An apparatus for separating mixed bodies according to claim 1 in which the extremity of the piece that is located below said means is made of ferro-cobalt.

6. A method of separating mixed substances that are but little magnetic through the action of a magnetic field which comprises, throwing said substances in a substantially horizontal direction into a substantially radial magnetic field with a small velocity such that the centre of curvature at the vertex of the parabola that said substances would describe if they were subjected merely to the action of gravity, coincides with the centre of said field.

7. An apparatus for separating mixed bodies that are but little magnetic which comprises in combination, means for producing a substantially radial magnetic field, and means for throwing said bodies into said field in a substantially horizontal direction with a small velocity such that in a vertical plane the centre of curvature of the parabola that said bodies would normally describe if subjected merely to the action of gravity coincides with the centre of said radial field in said plane.

8. An apparatus for separating mixed bodies that are but little magnetic which comprises in combination, an electro-magnet, two pole pieces of cylindrical shape for said electro-magnet having an air gap between them, the opposite faces of said respective pole pieces being so shaped in cross section as to produce a magnetic field all of the lines of force of which pass through an axis parallel to said cylindrical faces, and means for throwing said bodies into said air gap in the form of a sheet parallel to said axis in a substantially horizontal direction with a small velocity such that the centre of curvature of the parabola that each of said bodies would normally describe if it were subjected merely to the action of gravity at the vertex of said parabola is located on said axis.

9. An apparatus for separating mixed bodies that are but little magnetic which comprises in combination, an electro-magnet, two cylindrical pole pieces for said electro-magnet having an air gap between them, the cross sections of the opposite faces of said respective pole pieces having a common centre of curvature, and a chute for throwing said bodies into said air gap in the form of a sheet parallel to said cylindrical faces, the lower edge of said chute being located in the same vertical line as said centre of curvature, the vertical cross section of said chute having a substantially horizontal tangent at its lower end, and being so inclined as to impart to said bodies a relatively small horizontal velocity such that the centre of curvature of the parabola that each of said bodies would describe if it were subjected merely to the action of gravity, at the vertex of said parabola, coincides with the centre of curvature of said cross section.

10. An apparatus for separating mixed bodies that are but little magnetic which comprises in combination, an electro-magnet, two cylindrical pole pieces for said electro-magnet having an air gap between them, the cross sections of the opposite faces of said respective pole pieces having a common centre of curvature, a chute for throwing said bodies into said air gap in the form of a sheet parallel to said cylindrical faces, the lower edge of said chute being located in the same vertical line as said centre of curvature, the vertical cross section of said chute having a substantially horizontal tangent at its lower end, and being so inclined as to impart to said bodies a relatively small horizontal velocity such that the centre of curvature of the parabola that each of said bodies would describe if it were subjected merely to the action of gravity at the vertex of said parabola, coincides with the centre of curvature of said cross section, and a hopper located above said chute for pouring thereon the bodies to be separated.

11. An apparatus for separating mixed bodies that are but little magnetic which comprises in combination, an electro-magnet, two cylindrical pole pieces for said electro-magnet having an air gap between them, the cross sections of the opposite faces of said respective pole pieces having a common centre of curvature, a chute for throwing said bodies into said air gap in the form of a sheet parallel to said cylindrical faces, the lower edge of said chute being located in the same vertical line as said centre of curvature, the vertical cross section of said chute having a substantially horizontal tangent at its lower end, and being so inclined as to impart to said bodies a relatively small horizontal velocity such that the centre of curvature of the parabola that each of said bodies would describe if it were subjected merely to the action of gravity at the vertex of said parabola, coincides with the centre of curvature of said cross section, and means for imparting to said chute an oscillatory motion in a direction at right angles to the direction of movement of said bodies along said chute.

ROBERT CHARLES FORRER.